Figure 1:
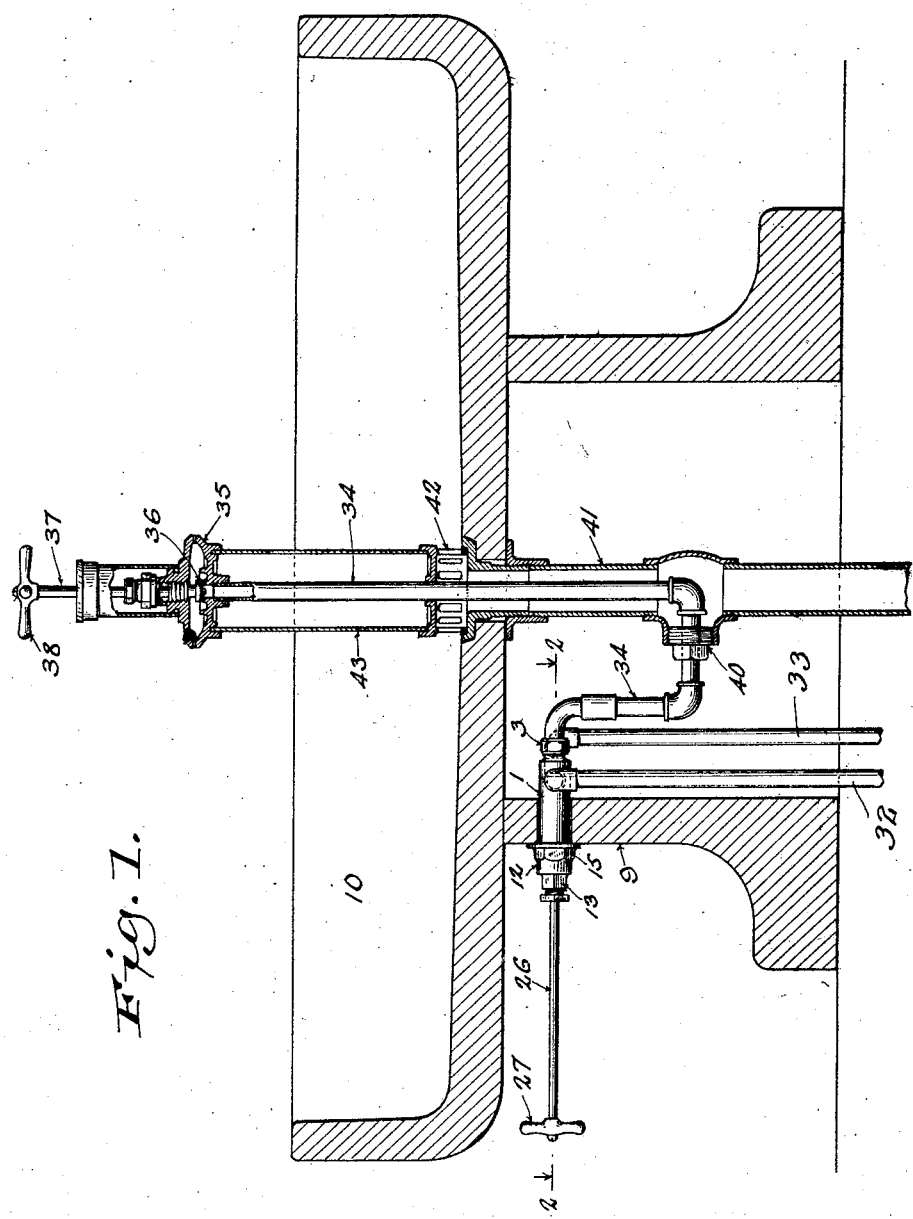

April 6, 1926.

L. SCHLESINGER 1,579,492

MIXING VALVE

Filed July 14, 1923

2 Sheets-Sheet 1

INVENTOR:
Louis Schlesinger,
BY
ATTORNEYS

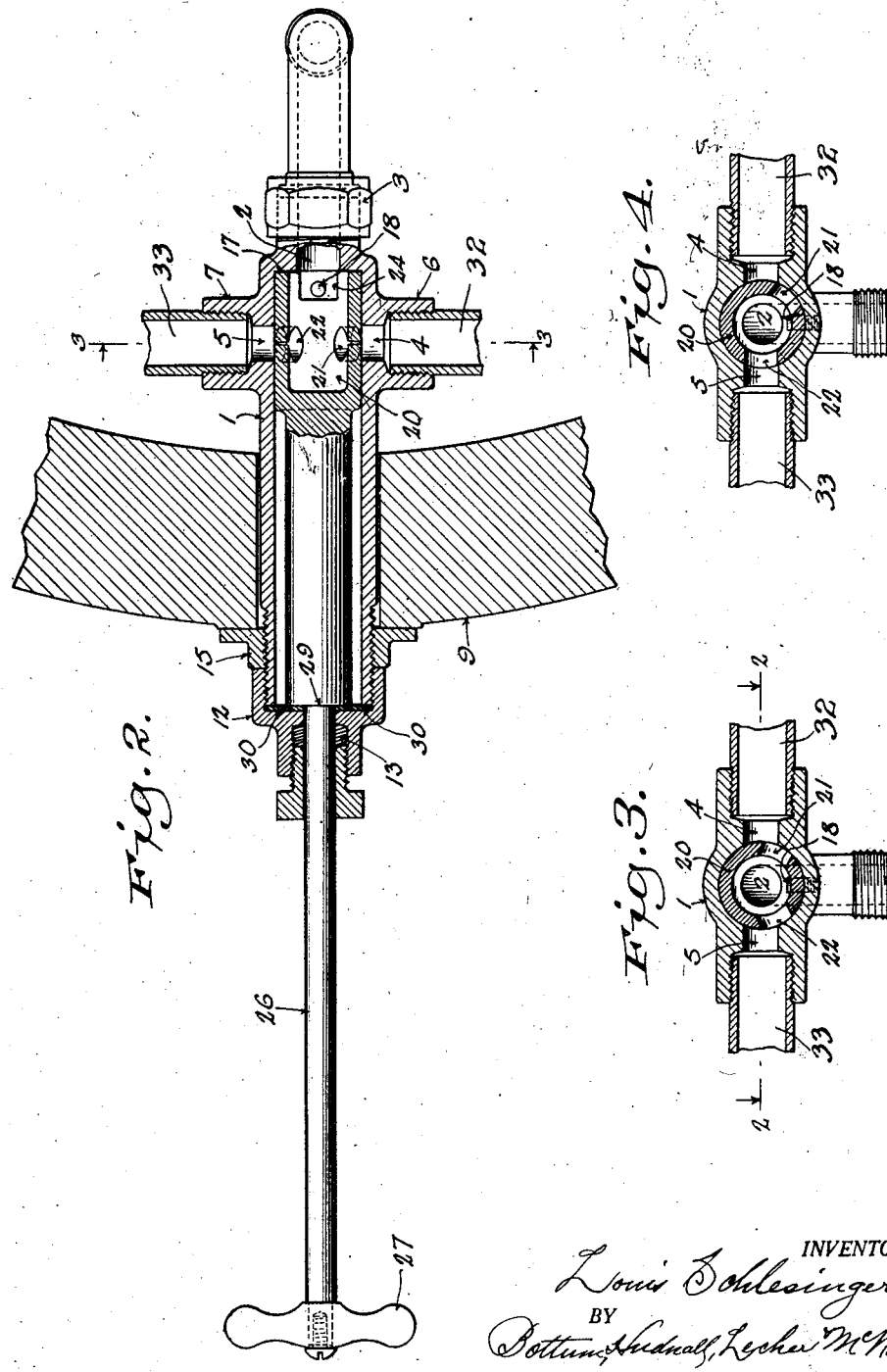

Patented Apr. 6, 1926.

1,579,492

UNITED STATES PATENT OFFICE.

LOUIS SCHLESINGER, OF MILWAUKEE, WISCONSIN, ASSIGNOR TO BRADLEY WASH-FOUNTAIN CO., OF MILWAUKEE, WISCONSIN, A CORPORATION OF WISCONSIN.

MIXING VALVE.

Application filed July 14, 1923. Serial No. 651,544.

*To all whom it may concern:*

Be it known that I, LOUIS SCHLESINGER, a citizen of the United States, residing at Milwaukee, in the county of Milwaukee and State of Wisconsin, have invented certain new and useful Improvements in Mixing Valves, of which the following is a specification, reference being had to the accompanying drawing, forming a part thereof.

This invention relates particularly to mixing valves for varying the temperature of water supplied to a lavatory or bath.

Its main objects are to regulate the temperature of the water supply without changing or affecting its rate of flow, and generally to simplify and improve the construction and operation of devices of this class.

It consists in the construction, arrangement and combination of parts as hereinafter particularly described and pointed out in the claim.

In the accompanying drawing like characters designate the same parts in the several figures.

Figure 1 is a side elevation of a mixing valve as constructed and installed in accordance with the invention, with a lavatory which is shown in central vertical section; Fig. 2 is an enlarged horizontal section on the line 2—2, Figs. 1 and 3, of the mixing valve and its connections; Fig. 3 is a vertical cross section on the line 3—3, Fig. 2, showing the mixing valve plug adjusted to supply a mixture of hot and cold water to the lavatory; and Fig. 4 is a similar section showing the plug adjusted to supply hot water only to the lavatory.

The mixing valve per se, which constitutes the principal part of the invention, comprises a cylindrical casing 1, provided at one end with an axial outlet port 2 and pipe coupling 3, and on opposite sides with lateral inlet ports 4 and 5 and pipe couplings 6 and 7. The casing is extended on the opposite side of the inlet ports from the outlet port, to pass through the wall of a lavatory or part of a lavatory, such as a hollow pedestal 9 on which a washbowl or basin 10 is mounted.

At its outer end the casing has a removable cap 12, threaded thereon and provided with a stuffing box 13. Between the cap 12 and the wall of the pedestal 9, a flanged collar 15 is threaded on the valve casing 1, to close the opening in the pedestal through which the casing passes, support the casing against inward displacement, and serve as a lock nut for the cap.

At its inner end around the outlet port 2, the casing is formed with a shoulder 17, and adjacent this shoulder, is provided with an inwardly projecting stop stud 18.

A hollow cylindrical plug 20, rotatably fitted in the casing 1 with its open end seated against the shoulder 17 around the outlet port 2, is provided with lateral ports 21 and 22 opening into its bore and arranged to register in extreme positions of the plug with and fully open, either inlet port 4 or 5, while the other inlet port is closed, as shown for example, in Fig. 4, and in intermediate positions to partially open both inlet ports, as shown in Fig. 3, the combined area of the partially opened inlet ports in all intermediate positions of the plug being equal to the area of either fully opened inlet port.

At its inner open end the valve plug is formed with a notch 24, the sides of which, by engagement with the stud 18, act as stops to limit the movement of the plug in either direction in position to fully open either of the inlet ports 4 and 5, while the other of said ports is closed, as shown in Fig. 4.

The valve plug is formed or provided with an operating stem 26, extending through the cap 12 and stuffing box 13, and provided at its outer end with a handle 27. At its inner end the stem is enlarged or is formed adjacent the outer end of the casing 1, with a shoulder 29, and between this shoulder and the cap 12, a packing washer 30 is interposed to hold the plug snugly against the shoulder 17 and to prevent leakage between the casing and cap.

The mixing valve is specially designed for use with a lavatory in connection with a valve for controlling and regulating the supply of water to the lavatory independently of the mixing valve, the sole function of which is to regulate the temperature of the water without affecting its volume or rate of flow.

In the installation of the mixing valve in connection with a lavatory having a fountain provided with a valve for controlling and regulating the supply of water thereto, the inlet ports 4 and 5 of the mixing valve are connected with cold and hot water supply pipes 32 and 33 respectively, and the outlet port 2 is connected by a pipe 34 with the fountain head 35 of the lavatory.

As shown in Fig. 1, the fountain head 35 is supported centrally above the basin or bowl 10 at the upper end of the pipe 34, and is provided with a discharge orifice or an annular series of orifices adapted to discharge water outwardly and downwardly into the bowl within convenient reach of a number of persons standing around the bowl.

Above and in alignment with the pipe 34 the lower wall of the head 35 is provided with an inlet port and valve seat, to which is fitted a valve 36 for controlling and regulating the admission of water into the head. The valve 36 is provided with an upwardly extending operating stem 37 having a handle 38 at its upper end accessible to users of the lavatory on all sides of the bowl. The pipe 34 perferably passes through a removable screw plug 40, threaded in a lateral opening in a part of the waste pipe 41 of the lavatory, thence upwardly through said waste pipe to the fountain head 35, which is centrally supported thereon. The waste pipe 41 is connected with a central opening in the bottom of the bowl or basin 10 by a coupling supporting an outlet fitting and strainer 42, through which the pipe 34 passes upwardly to the fountain head. A tubular housing and standard 43, mounted at its lower end on the fitting 42, surrounds the pipe 34 and cooperates with said pipe to support the fountain head 35 at its upper end.

With this arrangement of the pipe connections, a single opening in the bottom of the bowl or basin 10 serves for the waste outlet of the bowl and for the water supply to the fountain head, and the connection between the mixing valve and the fountain head, the cold and hot water supply pipes to the mixing valve and the waste pipe from the bowl, are enclosed, concealed and protected by the pedestal 9 and the tubular housing and standard 43.

The mixing valve being located near the top of the pedestal underneath the bowl is out of the way and practically out of sight, and the handle 27 on the extended stem 26 is in a conveniently accessible position at one side of the bowl and out of the way.

Various changes in minor details of construction of the mixing valve and in the connections of the valve, with lavatories having bowls or basins and fountains of different designs, may be made without departure from the principle and scope of the invention as defined in the following claim.

I claim:

In a mixing valve the combination of a cylindrical casing provided at one end with an outlet port and pipe connection, an internal shoulder around the outlet port, and an inwardly projecting stop stud, and adjacent the same end on opposite sides with inlet ports and pipe couplings; a hollow cylindrical plug rotatably fitting in the bore of the casing with its end against said shoulder and its bore in open communication with said outlet port, and provided with lateral ports opening into its bore and arranged to register with and open one inlet port while the other inlet port is closed and in intermediate positions to partially open both inner ports, stops formed by the sides of a notch in the open end of the plug arranged for engagement with said stop stud to limit the movement of the plug in either direction in position to open either inlet port; a removable cap threaded on the end of the casing opposite the outlet port and provided with a stuffing box; and a stem attached at one end to and extending axially outward from the plug through the cap and stuffing box and provided with a shoulder for engagement with the cap.

In witness whereof I hereto affix my signature.

LOUIS SCHLESINGER.